Patented July 21, 1953

2,646,414

UNITED STATES PATENT OFFICE 2,646,414

POLYVINYL CHLORIDE POLYMER DISPERSION

Robert H. Gillespie, Walpole, Mass., assignor to The Kendall Company, Boston, Mass., a corporation of Massachusetts No Drawing. Application March 13, 1952, Serial No. 276,439

5 Claims. (Cl. 260—32.8)

The present invention relates to non-aqueous high-molecular-weight vinyl chloride polymer dispersions and is more particularly concerned with a vinyl chloride polymer dispersion in an organic liquid containing a relatively low-molecular-weight vinyl chloride polymer in solution in the organic liquid.

High-molecular-weight vinyl chloride polymers, of an average molecular weight above about 20,000, have been found to be highly advantageous as coatings in applications requiring great inertness and resistance to chemical or atmospheric attack but such polymers, due to the low solids content of their solutions, have been uneconomical to apply in the form of coatings. Coating compositions having higher solids content have been produced from these polymers in the form of the so-called organosols, wherein the polymer, usually in slightly swollen condition, is present in the form of a suspension or dispersion in a mixture of organic liquids comprising a dispersant and a diluent, typically a ketone and an aromatic hydrocarbon, by a tedious, time-consuming and expensive grinding of the polymer in a ball-mill in the presence of the diluent and dispersant, but such compositions consequently have been expensive to manufacture. The two types of organic liquid must be present in carefully balanced and adjusted proportions which requirement limits the utility of the compositions.

In accordance with my invention, I provide dispersions of unusually high solids content for a given viscosity consisting essentially of high-molecular-weight vinyl chloride polymers dispersed in a solution of a relatively low-molecular-weight vinyl chloride polymer in a volatile organic liquid consisting essentially of a ketone. Such dispersions may be prepared by first forming a ketone solution of the low-molecular-weight polymer and then vigorously stirring into this solution the high-molecular-weight polymer, or all of the polymers may be stirred into the ketone simultaneously.

By the present invention I avoid the necessity of maintaining a careful balance of at least two different organic liquids while nevertheless obtaining a high solids content for a given viscosity sufficient to form thick coatings in a single application to a base material. Furthermore, films prepared by the removal of the organic liquid from my dispersions are stronger and tougher than films similarly prepared from the organosols of the prior art, and coatings prepared from my dispersions have higher bond strength to base materials. By my invention the time-consuming ball-milling operation of the prior art is no longer necessary and substantial economies are realized thereby. My product has further advantages which will be referred to hereinafter.

The following example is given as an illustration of the invention:

Example 160 lbs. of acetone, 31 lbs. of dioctyl phthalate and 8 lbs. of ethyl phthalyl ethyl glycollate are placed in a 55 gal. tin-lined drum provided with a stirring paddle consisting of a stainless steel shaft and three-bladed propellers at the top, bottom and middle of the shaft. The stirrer is started and 27 lbs. of a low-molecular-weight copolymer of vinyl chloride and vinyl acetate (Vinylite VYHH) wherein vinyl chloride and vinyl acetate are combined in the proportions of 87% vinyl chloride to 13% vinyl acetate, having an average molecular weight of 9,000 to 12,000 are added with continued stirring. At the end of one hour all of the polymer is in solution and the mass is of a smooth consistency. With continued stirring 50 lbs. of an emulsion-polymerized vinyl chloride copolymer (Vinylite VYNV) of average molecular weight 24,000 and containing vinyl chloride and vinyl acetate combined in the ratio of about 95 : 5 are added. The high-molecular-weight polymer is not dissolved but is slightly swollen and is dispersed in the low-molecular-weight polymer-acetone solution. Care is taken to prevent the temperature of the mix from rising above 95° F. At the end of one hour the mass is a smooth dispersion in which the high-molecular-weight polymer is in the disperse phase. This composition was found to be highly suitable for the coating of fabrics to form a collar-interliner material by the conventional knife-coating technique, producing a flexible, firmly adherent coating.

In general, I employ as the high-molecular-weight polymer a vinyl chloride polymer (or mixture of polymers) which is relatively insoluble in ketones such as acetone. Typically the desired high-molecular-weight polymers are formed by polymerization of aqueous emulsions of the monomer. The polymer must be one which is at most only slightly swelled by the action of ketones such as acetone. Vinyl chloride polymers (inclusive of copolymers) having an average molecular weight above about 20,000 in which the combined vinyl chloride exceeds about 90% by weight are satisfactory. The vinyl chloride may constitute as much as 100% of the polymer or the polymer may include a copolymerized component, typically vinyl acetate, or any of the polymerizable olefinic compounds such as vinyl propionate, vinylidine chloride, diethyl fumarate, acrylonitrile, the acrylate esters such as methyl acrylate, ethyl acrylate, propyl acrylate and methyl methacrylate, and the maleate esters such as dimethyl maleate and dibutyl maleate.

The low-molecular-weight vinyl chloride polymer (or mixture of polymers) which I employ is one which shows an appreciable solubility in ketones of the class hereinafter described, i. e., up to about 10% by weight, and which is a vinyl chloride polymer (inclusive of copolymers) of a molecular weight between 5,000 and 16,000 and having in excess of about 60% by weight combined vinyl chloride in the molecule. The copolymerized components may be any of those mentioned above. More than one individual polymer from either the high-molecular-weight or the low-molecular-weight group may be employed without departing from the spirit of my invention. For example, two polymers having average molecular weights of 8,000 and 12,000 may be substituted for a single polymer having an average molecular weight of 10,000 with substantially the same results.

While acetone, as employed in the above example, is the preferred volatile organic liquid, I have found that the substantial advantages of my invention are provided by the use of any one or more of the alkyl ketones, having the general formula

wherein $R_1$ and $R_2$ are alkyl groups selected from the class consisting of methyl, ethyl, n-propyl, isopropyl and isobutyl. I much prefer acetone, however, because, as I have found, it produces compositions of a higher solids content for a given viscosity than can be obtained with any of the other mentioned liquids, or with any other liquid so far as I am aware. I believe that the high solids content for a given viscosity of my composition is to be attributed, in part at least, to the substantial absence therefrom of the conventional aromatic hydro-carbons. Acetone has the further advantage of cheapness and of high volatility whereby its removal from coatings deposited from my composition can be quickly and inexpensively effected.

I employ sufficient acetone, or its equivalent, to dissolve the low-molecular-weight polymer and permit the high-molecular-weight polymer to be mixed with and dispersed in the solution. Typical compositions contain 30% to 75% acetone or its equivalent.

Any of the plasticizers well known in the art for use with the vinyl resins may be included in my compositions in the usual range of proportions.

Inasmuch as the volatile organic liquid of my dispersions consists essentially of a ketone, my composition is free from the problems associated with the conventional organosols arising from the necessity of maintaining a careful balance between the amounts of diluent and dispersant which they contain. Thus plasticizers of many various types and in a wide range of proportions may be incorporated in my composition as there is no liquid balance to be disturbed. A further advantage is that the viscosity can readily be adjusted, as required, by mere addition of acetone without risk of gelling the composition.

The ratio of the low-molecular-weight polymer to the high-molecular-weight polymer may be varied in my composition over a wide range, from about 1 : 1 to about 1 : 50 by weight without any adverse effect on the stability, to provide products of different physical properties. In this way compositions of widely different softening points, for example, can readily be formulated from the same basic ingredients.

My composition finds valuable applications as a caustic-resistant coating for containers, as a coating for various base materials, such as paper, asbestos, leather and metal foil, and as a coating for metallic electrical conductors.

In compositions which are to be used for the coating of fabric to form clothing interliner material I prefer to include at least two different plasticizers which differ in their degree of leachability by water. One such plasticizer, e. g. dioctyl phthalate, is highly resistant to leaching from the coating by water and the other is appreciably less resistant in this respect than dioctyl phthalate. This particular combination, I have found, provides durable flexibility in films laid down from the composition. A desirable porosity and permeability to moisture results by virtue of progressive loss of plasticizer by the leaching effect of laundering. This specific combination constitutes one preferred embodiment of my composition.

The present application is a continuation-in-part of my prior copending application Serial No. 144,204, filed February 14, 1950.

I claim:

1. A stable liquid organosol coating composition consisting essentially of a disperse solid phase comprising 1 to 50 parts by weight of at least one finely-divided high-molecular-weight emulsion-polymerized vinyl chloride polymer having an average molecular weight above 20,000 and a combined vinyl chloride content in excess of 90% by weight of the polymer in a continuous phase of a solution of 1 part of at least one relatively low-molecular-weight vinyl chloride polymer having an average molecular weight between 5,000 and 16,000 and a combined vinyl chloride content in excess of about 60% by weight of the polymer, and a plasticizer in a volatile organic liquid consisting essentially of an alkyl ketone having the general formula

wherein $R_1$ and $R_2$ are alkyl groups selected from the class consisting of methyl, ethyl, n-propyl, isopropyl and isobutyl.

2. A composition as defined in claim 1 in which the organic liquid is acetone.

3. A composition as defined in claim 1 in which said organic liquid comprises between about 30% to 75% by weight of the composition.

4. A composition according to claim 2 in which the high-molecular-weight emulsion-polymerized vinyl chloride polymer is polyvinyl chloride and the low-molecular-weight vinyl chloride polymer is a copolymer of vinyl chloride and vinyl acetate in the ratio of about 87 : 13.

5. A composition according to claim 2 in which the high-molecular-weight emulsion-polymerized vinyl chloride polymer is a coplymer of vinyl chloride and vinyl acetate in the ratio of about 95 : 5, and the low-molecular-weight vinyl chloride polymer is a copolymer of vinyl chloride and vinyl acetate in the ratio of about 87 : 13.

ROBERT H. GILLESPIE.

References Cited in the file of this patent

UNITED STATES PATENTS

| Number | Name | Date |
|---|---|---|
| 2,530,738 | Spessard | Nov. 21, 1950 |